UNITED STATES PATENT OFFICE.

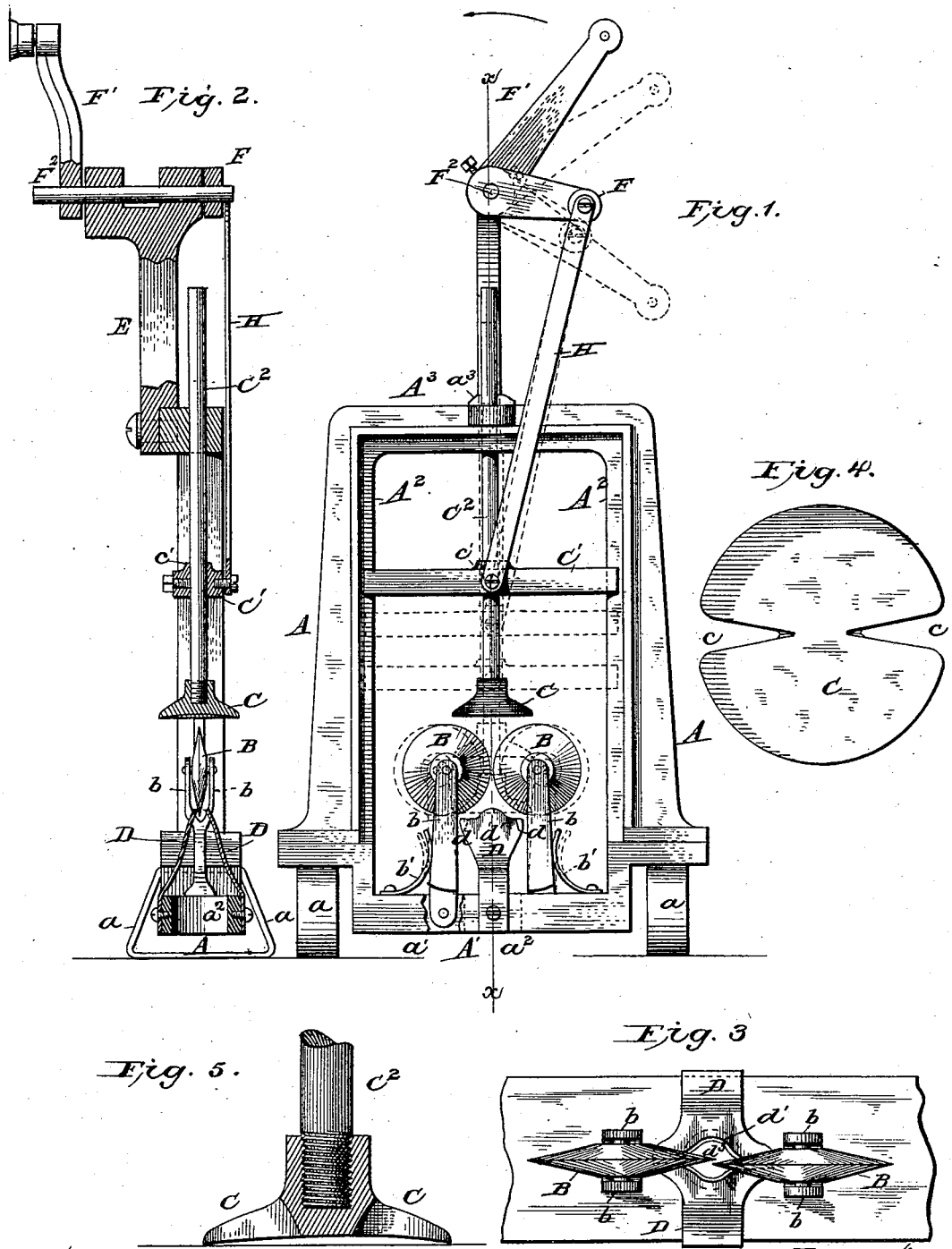

ISAAC F. BETTS, OF WILMINGTON, DELAWARE.

PEACH-STONER.

SPECIFICATION forming part of Letters Patent No. 267,320, dated November 14, 1882.

Application filed August 16, 1882. (No model.)

*To all whom it may concern:*

Be it known that I, ISAAC F. BETTS, a citizen of the United States, residing at Wilmington, in the county of New Castle and State of Delaware, have invented certain new and useful Improvements in Peach-Stoners; and I do hereby declare the following to be a full, clear, and exact description of the invention, such as will enable others skilled in the art to which it appertains to make and use the same.

My invention relates to devices for stoning fruit.

The nature of it consists of parts and combination of parts, all as will hereinafter be described and claimed.

Referring to the drawings, Figure 1 represents a front elevation, showing the parts in full lines ready for work — the dotted lines show the position that the parts assume in working; Fig. 2, a vertical section on line X X, Fig. 1; Fig. 3, a detached view, showing the rotary and side knives in top plan view; Fig. 4, a bottom plan view of the plunger-head, and Fig. 5 a section view of the plunger.

A represents the frame; B B, the cutter-wheels; C $C^2$, the plunger; D D, the side knives for stoning the peach.

Frame A may be of any shape, but is preferably of the form shown, and is provided on its under side with loops $a\ a$, by which it can be fastened to any suitable object. The base A' is provided with slots $a'$, in which the standards $b\ b$ are pivoted. Between slots $a'$ is an opening, $a^2$, for the peach-stone to drop through. Upon the inner side of the frame are ways $A^2\ A^2$ for the cross-head C'. In the top $A^3$ is an opening, $a^3$, in which the plunger-rod works. Attached to the top is a bracket, E, provided with bearing for the shaft $F^2$ of cranks F and F', which are respectively attached at opposite ends of shaft $F^2$. Crank F' is provided with a handle for an obvious purpose. To crank F is attached a rod, H, which extends down to and is pivoted at the center of cross-head C'. The cross-head is provided with a central opening, $c'$, through which the plunger-rod is inserted, and held by any suitable means. When the cranks are revolved rod H moves cross-head C' up and down upon the ways and causes the plunger to have a reciprocating movement.

The plunger consists of a rod, $C^2$, and head C, and is held in a vertical position by means of the top of the frame and the cross-head, to which it is adjustably attached. Head C is screwed upon the end of the rod, so that the latter can be removed from the frame by detaching it from the cross-head and withdrawing it through opening $a^3$. The head C is concave upon its under surface to cover the top of the fruit and prevent the latter from slipping when forced down against the knives. Two wedge-shaped slots, $c\ c$, of about the same depth as the radii of the knives, are formed in the head, as shown in Fig. 4. The apices of these slots may be provided with a hardened piece of steel or knife-sharpener, against which the cutting-edge of the wedge-shaped knives will revolve and be kept sharpened. The object of these slots is to permit the plunger-head passing between the wedge-shaped knives and force the stone between and the meat outside of spring-knives D D. These knives D D are placed upon opposite sides of the base A and project upwardly and inwardly. The top of each knife is provided with two straight edges, $d\ d$, which abut against similar parts on the opposite knife. The center $d'$ presents an outwardly-bulging appearance with an inwardly-inclined lip which projects above the straight edges $d\ d$ and forms an opening, $d^3$, of the same outline as a peach-stone would present in a horizontal cross-section. The object of knives D D is to strip the meat from the stone, which passes through opening $d^3$. The stone in passing through opening $d^3$ forces the knives apart, and the cutting-edges $d$ follow the course of the cut made by knives B, and the lips $d'$ pass between the meat and stone, owing to the fact that the tendency of the spring of the knives is to force the upper edges together. The inwardly-projecting lip will follow the surface of the stone without danger of tearing the meat in any place except around the stone. The wedge-shaped revolving circular knives B B are journaled to standards $b$, which are pivoted in the slots $a'$ in base A'. The knives are preferably journaled with the cutting-edges of each knife on opposite sides of a median line extending longitudinally along the base, so that the knives will enter the peach at one side of the joint of the stone. The object in so placing the knives is to prevent the cutting-edges from entering the joint of and splitting the stone, which splitting would render it more difficult for the knives D D to remove the meat. The peach when forced down between the knives B B by the plunger will cause them to revolve and cut into the peach. To permit these knives to move around the stone, the standards are supported by springs $b\ b$, which tend to force the knives together, but have sufficient elasticity to permit the knives to move outwardly when the bulge of the stone becomes opposite to them. The knives are made wedge-shaped, so that they will spread the meat at the same time they cut.

The operation is as follows: A peach is placed above knives B B, and the plunger forced down by turning crank F'. The concave portion of head C embraces the top part of the peach and prevents it from slipping. The plunger forces the peach between the knives B B, which cut and spread the meat away from the stone. The head C, by means of wedge-shaped slots $c$, passes between the knives B B and forces the stone in the opening $d^3$ and the meat over the outer surface of the knives D D. A suitable receptacle is provided on each side for catching the meat and another receptacle under opening $a^2$ for the stones.

If desired, a hopper may be attached above the knives for holding the peaches. A bowl-shaped hopper is preferred.

I am aware that concave and slotted plunger-heads, that stationary and pivoted knives for splitting the fruit, and that spring-knives for stripping the meat from the stone are all old, and to them I make no claim; but

What I claim as new is—

1. In a peach-stoner, the combination of a plunger, pivoted automatically-moving knives supported independently of the plunger, and side-cutting knives arranged below the plunger, for the purpose set forth.

2. In a peach-stoner, the combination, with a plunger having a concave head, of pivoted automatically-moving rotary knives and of side-cutting spring-knives arranged below the plunger, for the purpose set forth.

3. In a peach-stoner, the combination, with a plunger having a concave head and wedge-shaped slots, of pivoted automatically-moving knives and of side-cutting spring-knives arranged below the plunger, for the purpose set forth.

4. In a peach-stoner, a plunger having wedge-shaped slots provided with knife-sharpeners, for the purpose set forth.

5. In a peach-stoner, pivoted knives arranged in pairs, having their cutting-edges facing each other, but on opposite sides of a median longitudinal line, as set forth.

In testimony whereof I affix my signature in presence of two witnesses.

ISAAC F. BETTS.

Witnesses:
GEO. H. MURPHEY,
SAML. F. BETTS.